United States Patent [19]
Akasaka et al.

[11] Patent Number: 5,907,952
[45] Date of Patent: Jun. 1, 1999

[54] CAPACITY CONTROL DEVICE FOR A HYDRAULIC MOTOR FOR A HYDRAULICALLY DRIVEN VEHICLE

[75] Inventors: Tosiyuki Akasaka; Sadao Nunotani; Seita Hayashi, all of Tochigi, Japan

[73] Assignee: Komatsu Ltd., Japan

[21] Appl. No.: 08/952,385

[22] PCT Filed: May 23, 1996

[86] PCT No.: PCT/JP96/01375

§ 371 Date: Nov. 17, 1997

§ 102(e) Date: Nov. 17, 1997

[87] PCT Pub. No.: WO96/37718

PCT Pub. Date: Nov. 28, 1996

[30] Foreign Application Priority Data

May 23, 1995 [JP] Japan ................................ 7-123331

[51] Int. Cl.⁶ .................................................. F16D 31/02
[52] U.S. Cl. ......................................... 60/452; 60/445
[58] Field of Search ............................. 60/445, 447, 452

[56] References Cited

U.S. PATENT DOCUMENTS

| 5,070,695 | 12/1991 | Metzner | 60/452 X |
| 5,184,466 | 2/1993 | Schniederjan et al. | 60/452 X |
| 5,653,107 | 8/1997 | Beck | 60/452 |

FOREIGN PATENT DOCUMENTS

| 62-255658 | 11/1987 | Japan . | |
| 3-204454 | 9/1991 | Japan . | |
| 4-76811 | 4/1992 | Japan . | |
| 406081807 | 3/1994 | Japan | 60/452 |
| 7-21305 | 8/1995 | Japan . | |

*Primary Examiner*—Hoang Nguyen
*Attorney, Agent, or Firm*—Rader, Fishman & Grauer; Ronald P. Kananen

[57] ABSTRACT

There is disclosed an apparatus for controlling the capacity of a hydraulic motor (5) in a hydraulically driven motor vehicle, which comprises: a hydraulic pump (2) adapted to be driven by an engine (1) having a variable rotation speed; the hydraulic motor of a variable capacity type adapted to be rotated by a discharge pressure fluid from the hydraulic motor for driving a traveling body that constitutes the motor vehicle allowed to travel; a capacity control section for reducing the capacity of the hydraulic motor when the rotation speed of the engine is increased and for increasing the capacity of the hydraulic motor when the rotation speed of the engine is reduced, the capacity control section having a variable operation rate and being operable at a variety of positions among a maximum capacity position, an intermediate capacity position and a minimum capacity position; and an operation rate control unit for accelerating the operation rate of the capacity control section when it is operating at a position between the maximum capacity position and the intermediate capacity position mentioned above and for decelerating the above mentioned operation rate when the capacity control section is operating at a position between the intermediate capacity position and the minimum capacity position mentioned above.

5 Claims, 5 Drawing Sheets

CAPACITY CONTROL DEVICE FOR A HYDRAULIC MOTOR FOR A HYDRAULICALLY DRIVEN VEHICLE

TECHNICAL FIELD

The present invention relates to an apparatus for controlling the capacity of a hydraulic motor in a hydraulically driven motor vehicle in which the hydraulic motor of a variable capacity type is rotated by a discharge pressure fluid from a hydraulic pump for driving a traveling body that constitutes the motor vehicle allowed to travel with the hydraulic motor.

BACKGROUND ART

There has hitherto been known a hydraulically driven motor vehicle in which a hydraulic pump is driven by an engine and a hydraulic motor is rotated by a discharge pressure fluid from the hydraulic pump for driving a traveling body that constitutes the motor vehicle caused to travel with the hydraulic motor. In order to allow such a hydraulically driven motor vehicle to be accelerated and decelerated, the hydraulic motor has commonly been designed to be of a variable capacity type in which for the purpose of the vehicle acceleration the hydraulic motor is accelerated by increasing the capacity thereof and for the purpose of the vehicle deceleration the hydraulic motor is decelerated by reducing the capacity thereof.

As disclosed, for example, in Japanese Unexamined Patent Publication No. Sho 62-255658, it has been known that the capacity of a hydraulic pump can be gradually reduced by permitting an operating member for increasing and decreasing the capacity thereof to be operated in a direction in which the capacity is reduced and the capacity of the hydraulic pump can be swiftly increased by permitting the operating member to be operated in a direction in which the capacity is increased, thereby effecting a gradual deceleration of a motor vehicle while enhancing an ability thereof to swiftly accelerate itself.

It has also been known that a hydraulically driven motor vehicle having a hydraulic motor of variable capacity type can be provided with a servo cylinder assembly and a servo valve which are designed to control the capacity thereof in accordance with the pump pressure of a hydraulic pump and the rotation speed of an engine, in which the capacity of the hydraulic motor is reduced when the rotation speed of the engine is increased (when the vehicle is to be accelerated) to increase the rotation rate of the hydraulic motor and the capacity of the hydraulic motor is increased when the rotation rate of the engine is reduced (when the vehicle is to be decelerated) to reduce the rate of rotation of the hydraulic motor.

And, where it is desirable to change the capacity of the hydraulic motor in such a manner, it has been found that as in the case in which the capacity of the hydraulic pump is varied as described previously, not only is the ability to accelerate enhanced but also it is possible to decelerate gradually, by rapidly reducing the capacity of the hydraulic motor when the rotation speed of the engine has been increased whereas by gradually increasing the capacity of the hydraulic motor when the rotation speed of the engine has been reduced.

It has been found, however, that whereas the former system noted previously as disclosed in the Japanese Unexamined Patent Publication Sho No. 62-255658 in which the capacity of the hydraulic pump is controlled without regard to the pump pressure and the engine rotational speed makes it possible to control how to change the capacity variably as regards the directions in which it is increased and reduced, the latter system as described above in which a combination of the servo cylinder assembly and the servo valve is employed to control the capacity in accordance with the pump pressure and the engine rotational speed is not able, as it is, to control how to change the capacity variably with respect to the directions in which it is increased and decreased as in the former system.

For this reason, a measure has typically been taken in the prior art, in which a circuit for interconnecting the servo valve and the servo cylinder chambers is provided with a slow return valve whereby the speed of the servo piston at which it is displaced in a direction in which the capacity is reduced is accelerated whereas the speed of the servo piston at which it is displaced in a direction in which the capacity is increased is decelerated, thus making it possible to enhance the ability to accelerate quickly and to decelerate slowly.

It may be noted that it is preferred for the change in speed of a motor vehicle to be smaller when it is to be accelerated while it is traveling at a given speed, to be greater when it is being started from a stop, to be smaller initially when the traveling motor vehicle is being decelerated at an initial period of its deceleration, and to be greater immediately before it comes to a stop (at a final period of its deceleration).

Figure 1:
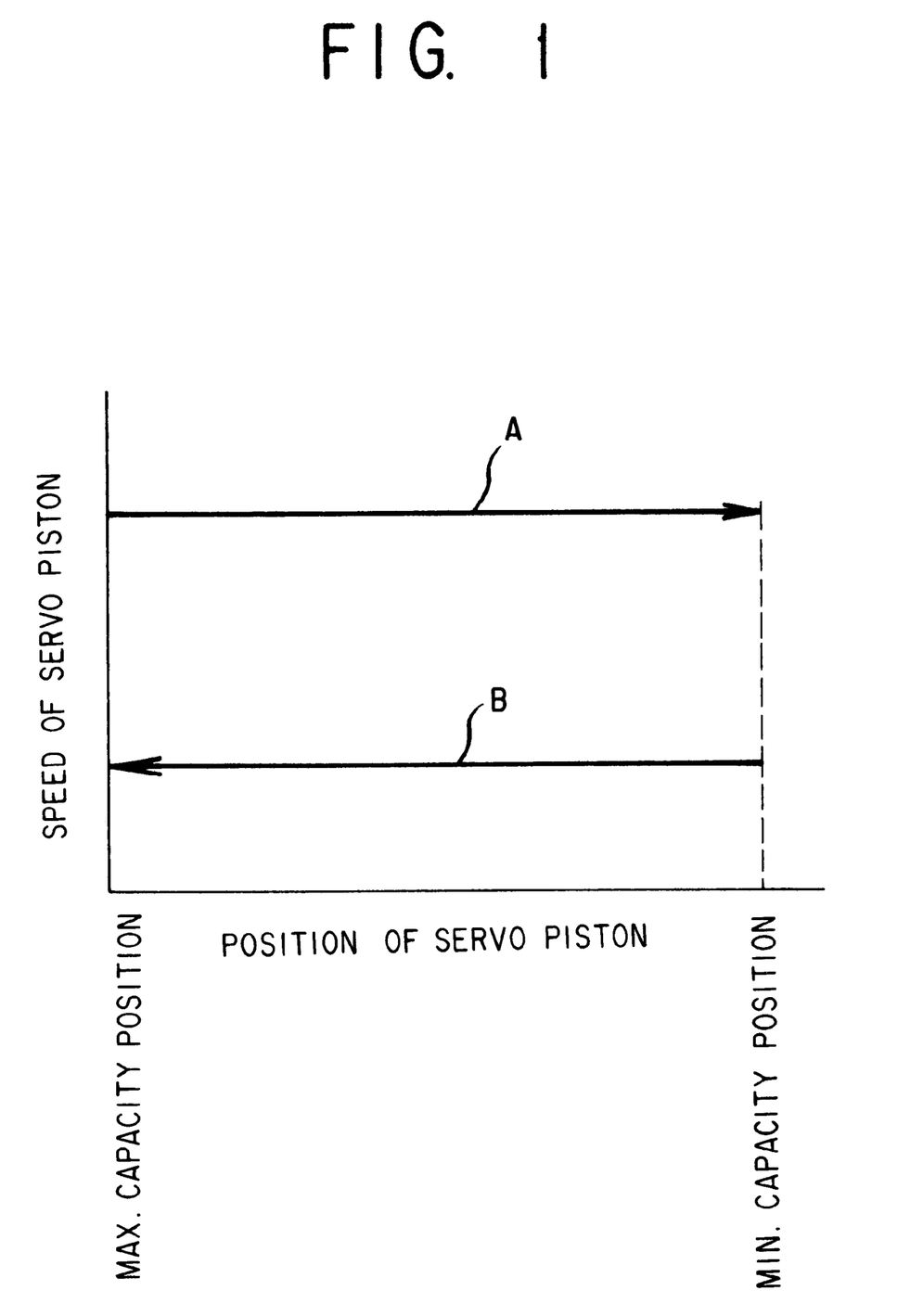
FIG. 1 is a graph that shows the speed of a servo piston with respect to the position thereof in an example of the prior art.

It is also noted that in a case where a slow return valve is provided as described previously, the speed of the servo piston at which it is displaced in the direction in which the capacity is reduced will be a given value that can be preset independently of any particular position of the servo piston, as shown by the line A in FIG. 1 of the drawings attached hereto. Likewise, the speed of the servo piston at which it is displaced in the direction in which the capacity is increased will then be a constant value that can be established independently of any specific position of the servo piston, as shown by the line B in FIG. 1.

Noting in this way the fact that where a slow return valve is employed, a speed of displacement of the servo piston is rendered constant independently of its position as shown by the lines A and B in FIG. 1, it has been the prior art practice to improve as a whole both the acceleration and deceleration characteristics by adopting as the acceleration characteristic the one that can be seen intermediate between one settable in a traveling period and one settable in a starting period and as the deceleration characteristic the one that can be found intermediate between one in an initial deceleration period and one settable in a final deceleration period, as noted above. It has now been discovered that such a measure as it is cannot give rise to a fully satisfactory entire acceleration and deceleration performance for the hydraulically driven motor vehicle.

With the above described problem taken into account, it is an object of the present invention to provide an apparatus for controlling the capacity of a hydraulic motor in a hydraulically driven motor vehicle, that is capable of giving rise to a fully satisfactory entire acceleration and deceleration performance for the motor vehicle by permitting the change in speed thereof to be smaller while it is traveling, to be greater while it is being accelerated in a period in which it is started, to be smaller in an initial period of its deceleration, and to be increased in a final period of the deceleration.

SUMMARY OF THE INVENTION

In order to achieve the above mentioned object, there is provided in accordance with the present invention an apparatus for controlling the capacity of a hydraulic motor in a hydraulically driven motor vehicle, which comprises:

a hydraulic pump adapted to be driven by an engine having a variable rotation speed;

the hydraulic motor of a variable capacity type adapted to be rotated by a discharge pressure fluid from the said hydraulic motor for driving a traveling body that constitutes the motor vehicle allowed to travel;

a capacity control section for reducing the capacity of the said hydraulic motor when the rotation speed of the said engine is increased and for increasing the said capacity when the said rotation speed is reduced, the said capacity control section having a variable operation rate and being operable at a variety of positions among a maximum capacity position, an intermediate capacity position and a minimum capacity position; and an operation rate control means for accelerating the said operation rate of the said capacity control section when it is operating at a position between the maximum capacity position and the intermediate capacity position and for decelerating the operation rate when the capacity control section is operating at a position between the intermediate capacity position and the minimum capacity position.

According to the construction set forth above, it can be seen and should be understood that the capacity of the hydraulic motor will be reduced when the rotation speed of the engine is increased and will be increased when the rotation speed of the engine is reduced. And, the capacity control section will be quickly operated when it is operating at a position between its maximum capacity position and its intermediate capacity position with the result that the change rate of the capacity is increased whereas the capacity control section will be slowly operated when it is operating at a position between its intermediate capacity position and its maximum capacity position with the result that the change rate of the capacity is reduced. As a consequence, the capacity of the hydraulic motor will be quickly reduced when the motor vehicle is to be accelerated while it is traveling, will be quickly reduced when the vehicle is being started, will be slowly increased in an initial period of the vehicle's deceleration and will be quickly increased in a final period of its deceleration. Accordingly, the change of speed of the motor vehicle will be smaller when it is to be accelerated while it is traveling, will be greater when the vehicle is to be accelerated while it is being started, will be smaller in an initial period of the vehicle's deceleration, and will be greater in a final period of the deceleration, thus giving rise to an acceleration and deceleration performance that is, as a whole, fully satisfactory for the motor vehicle.

In the construction described above, it is preferred that the capacity control section should include:

a servo cylinder assembly provided with a servo piston coupled to a capacity control member in the hydraulic pump and having a spring coupled thereto, a first pressure receiving chamber having a small pressure receiving area and a second pressure receiving chamber having a large pressure receiving area, which chambers are defined at both sides of the servo piston, respectively, the said first pressure receiving chamber being adapted to have a pump discharge pressure from the hydraulic pump applied thereto so that the servo piston may be displaced with a pressure fluid in the first pressure receiving chamber in a direction in which the capacity is increased, and may be displaced with a pressure fluid in the second pressure receiving chamber in a direction in which the capacity is reduced; and a servo valve adapted to be switched into one of a supply position and a drain position thereof, the supply position being switched into for supplying the pump discharge pressure fluid from the hydraulic pump into the second pressure chamber if a control pressure corresponding to a rotation speed of the engine is more than a sum of the pump discharge pressure of the hydraulic pump and a mounting load of the spring, the drain position being switched into for draining a pressure fluid from the second pressure receiving chamber if the control pressure is less than the sum of the pump discharge pressure and the mounting load, the servo valve being also adapted to increase the mounting load of the spring when the servo valve is at the supply position and to reduce the mounting load of the spring when the servo valve is at the drain position, whereby the mounting load of the spring is increased when the servo piston is displaced in the direction in which the capacity is reduced, and the mounting load of the spring is reduced when the servo piston is displaced in the direction in which the capacity is increased.

Further, it should be noted that the operation rate control means may include:

a variable restriction means having a variable area of opening disposed in a circuit for interconnecting the second pressure receiving chamber and the servo valve;

a position detector means for detecting a position taken by the servo piston to provide an output signal; and a controller means responsive to the output signal for increasing the variable opening area of the restriction means when the output signal indicates that the position of the servo piston detected by the position detector means lies between the maximum capacity position and for reducing the variable opening area of the restriction means when the output signal indicates that the position of the servo piston detected by the position detector means lies between the intermediate capacity position and the minimum capacity position.

It should also be noted that the operation rate control means may include a fluid passage formed in the servo piston for communicating the second pressure receiving chamber and the servo valve with each other, the fluid passage having a variable opening area adapted to be increased when the position of the servo piston lies between the maximum capacity position and the intermediate capacity position and adapted to be reduced when the position of the servo piston lies between the intermediate capacity position and the minimum capacity position.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a hydraulic motor capacity control apparatus for a hydraulically driven motor vehicle will be set forth with reference to the accompanying drawings hereof.

Explanation will now be given with respect to an apparatus according to a first embodiment of the present invention.

Figure 2:
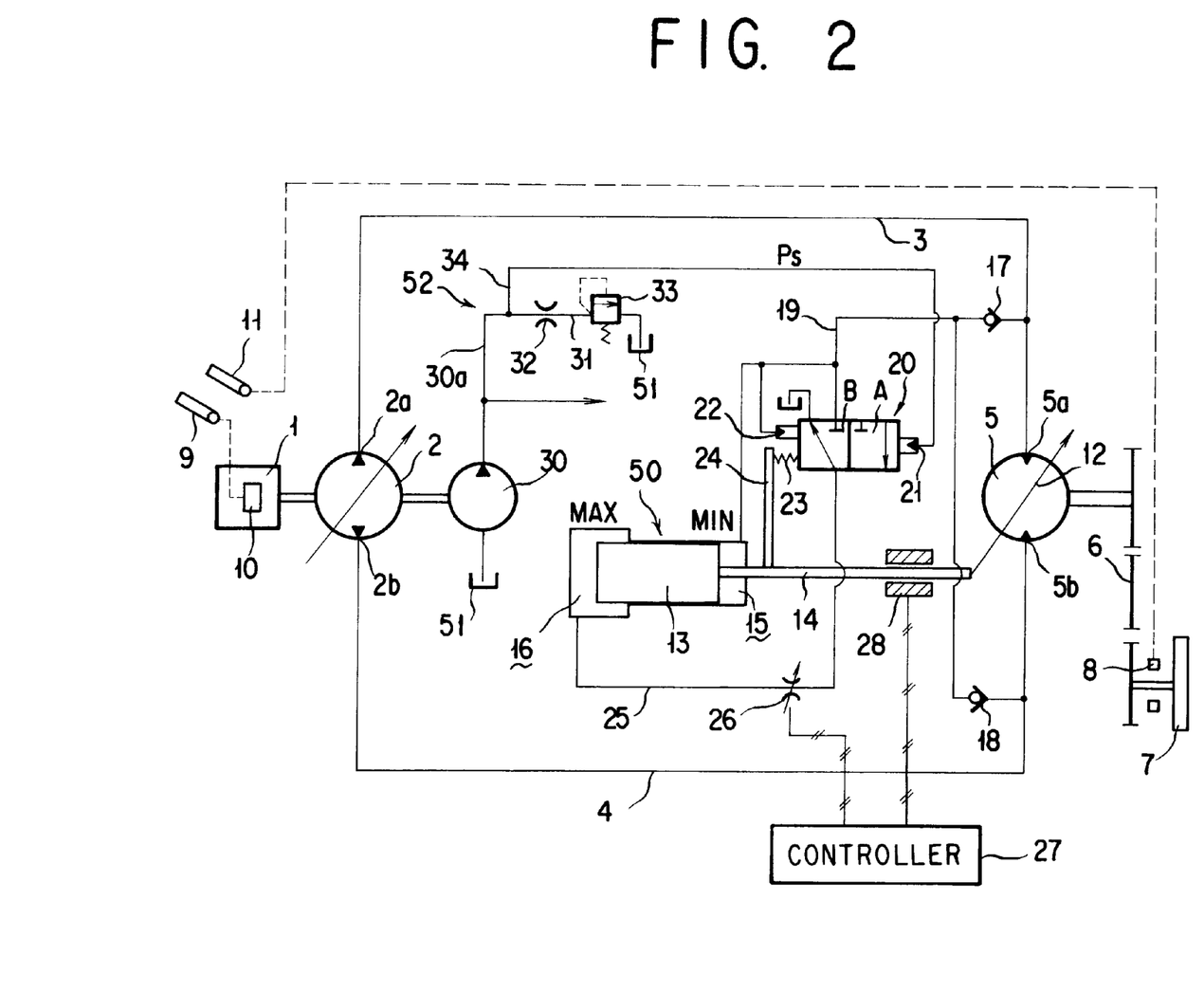
FIG. 2 is a hydraulic circuit diagram that shows a first embodiment with respect to a hydraulic motor capacity control apparatus for a hydraulically driven motor vehicle, according to the present invention.

As shown in FIG. 2, the apparatus includes an engine 1, a hydraulic pump 2 that is driven by the engine 1, and a hydraulic motor 5 a of variable capacity type that is rotated by a discharge pressure fluid from the hydraulic pump 2. The hydraulic pump 2 has a first port 2a and a second port 2b which are connected to a first port 5a and a second port 5b of the hydraulic motor 5 via a first main circuit 3 and a second main circuit 4, respectively, which form a closed circuit. The hydraulic motor 5 has an output side that is coupled via a power transmission mechanism 6 to a traveling body 7, constituting a motor vehicle, which may be braked by a mechanical brake 8.

The engine 1 has associated therewith an engine operating member 9 such as an accelerating pedal, which is designed to control the rotation speed of the engine 1 by furnishing a control input to a governor 10. Also, there is provided a brake operating member 11 such as a brake pedal 11 that is controlled to operate the brake 8.

The hydraulic motor 5 is provided with a capacity control member 12, such as a swash plate, therefor. The capacity control member 12 is coupled via a rod 14 to a servo piston 13 in a servo cylinder assembly 50. The servo cylinder assembly 50 includes a first pressure receiving chamber 15 having a small diameter and a second pressure receiving chamber 16 having a large diameter, the chambers 15 and 16 being provided at both end sides of the servo piston 13, respectively. The servo piston 13 is designed to be displaceable with a pressure in the first pressure receiving chamber 15 towards its maximum capacity position indicated by the letter "MAX" and with a pressure in the second pressure receiving chamber 16 towards its minimum capacity position indicated by the letter "MIN". The first pressure receiving chamber 15 is connected to a pump pressure introducing circuit 19 which is in turn connected via a pair of check valves 17 and 18 to the above mentioned first and second main circuits 3 and 4. The second pressure receiving chamber 16 is switchably connected to the pump pressure introducing circuit 19 and a reservoir 51 via a servo valve 20.

The servo valve 20 is provided with a first pressure receiving portion 21, a second pressure receiving portion 22 and a spring 23, and has a spool that is adapted to be thrusted to a supply position A under a pressure at the first pressure receiving portion 21 and to be thrusted to a drain position B under a pressure at the first pressure receiving portion 21 and a pressure of the spring 23. The spring 23 is coupled via a link 24 to the above mentioned rod 14. The first pressure receiving portion 21 is connected to a control pressure generating means 52 that is designed to output a control pressure which is proportional to a rotation speed of the engine 1. Thus, a control pressure Ps that is proportional to a rotation speed of the engine 1 will there be generated to act on the first pressure receiving portion 21. It should be noted also that the above mentioned pump pressure introducing circuit 19 is connected to the second pressure receiving portion 22 so that a pump discharge pressure may be acting thereon.

It will thus be apparent that the servo cylinder assembly 50 and the servo valve 20 are provided to constitute a capacity control section of the present invention for controlling the capacity of the hydraulic motor 5.

A variable restriction 26 is provided midway in a circuit 25 that interconnects the first pressure receiving chamber 16 and the servo valve 20. The variable restriction 26 has a variable opening area that can be controlled by a controller 27. The controller 27 is designed to accept an input that is representative of a position of the servo piston 13 which may be sensed by a displacement meter 28. The opening area of the variable restriction 26 is adapted to be varied by means of a proportional solenoid to which the amperage is designed to be established by the controller 27.

Figure 3:
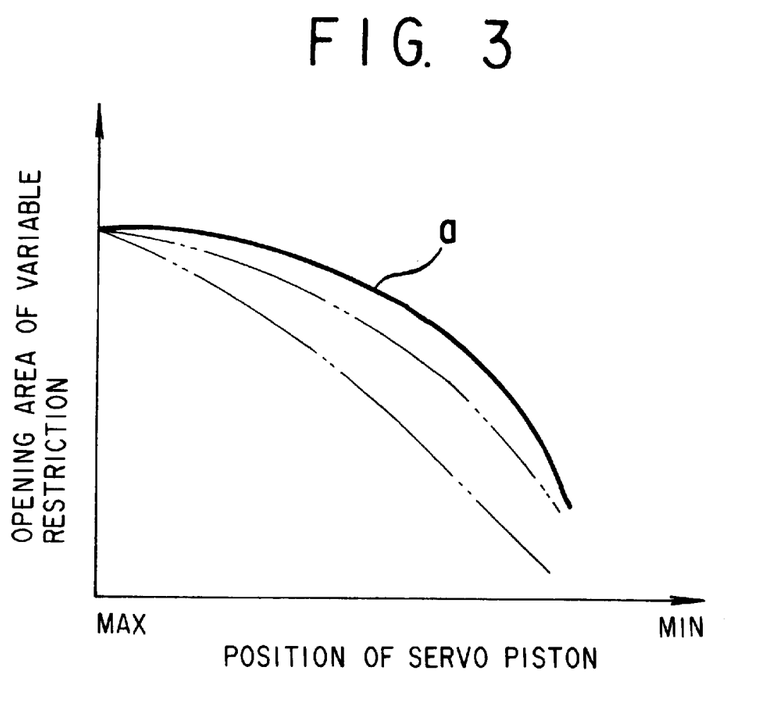
FIG. 3 is a graph that shows a relationship between the position of a servo piston and the opening area of a variable restriction in the above mentioned first embodiment of the present invention.

Thus, the variable opening area of the variable restriction 26 is controllable by the controller 27 in accordance with the position of the servo piston 13 as shown by the curve a in FIG. 3. For instance, the opening area will be greater if the servo piston 13 is located closer to its maximum capacity position (MAX), and will be reduced successively as it is displaced towards its minimum capacity position (MIN).

The above mentioned control pressure generating means 52 is constituted of a control hydraulic pump 30 that is driven by the engine 1, a drain circuit 31 connected to a discharge path 30a of the hydraulic motor 30, a restriction 32 and a low pressure relief valve 33 which are provided in the drain circuit 31, and a detector circuit 34 whose one terminal is connected to an upstream side of the restriction 32 and whose other terminal is connected to the first pressure receiving portion 21 of the servo valve 20. It is thus at the detector circuit 34 that the control pressure Ps is generated which is proportional to a speed of rotation of the engine 1.

An explanation will next be given with respect to an operation of the servo cylinder assembly 50 and the servo valve 20.

If the control pressure Ps is elevated to exceed the pump discharge pressure of the hydraulic pump 2 (i.e., the vehicle driving pressure provided by the hydraulic motor) in the state shown in FIG. 2, the servo valve 20 will assume its supply position A so that the pump discharge pressure may be applied into the second pressure receiving chamber 16 as well. It then follows that the servo piston 13 with a pressure difference depending on the pressure receiving area difference between the first pressure receiving chamber 15 and the second pressure receiving chamber 16 will be displaced in the direction in which the capacity is reduced (rightwards in FIG. 2) to allow the capacity control member 12 to be swung in the direction in which the capacity is reduced, thereby reducing the capacity of the hydraulic motor 15.

Then, since the mounting load of the spring 23 is increased because the servo piston 13 is allowed to move in the direction in which the capacity is reduced, the servo valve 20 will assume its drain position B. As a result, the pressure in the second pressure receiving chamber 16 will be lowered to cause the servo piston 13 under the pump discharge pressure in the first pressure receiving chamber 15 to be displaced in the direction (leftwards in FIG. 2) in which the capacity is increased. Then, the mounting load of the spring 23 will be reduced, thus permitting the servo valve 20 to assume the position A again.

Thus, with such an operation repeated, it follows that the capacity of the hydraulic motor 5 will be controlled to become a value that is commensurate with its pump discharge pressure and the control pressure Ps (equivalent to the rotation speed of the engine 1).

It should also be noted that if the control pressure Ps is reduced to be lower than the pump discharge pressure of the hydraulic pump 2, the servo valve 20 will assume the drain position B to cause the pressure within the second pressure receiving chamber 16 to be lowered. This will result in a displacement of the servo piston 13 in the direction in which the capacity is reduced. Then, since the mounting load of the spring is reduced, the servo valve 20 will be returned to assume the position A to allow the pump discharge pressure to be applied into the second pressure receiving chamber 16 as well, thereby displacing the servo piston 13 in the direction in which the capacity is reduced. Thus, in the same principle as described earlier, the capacity of the hydraulic motor 5 will be controlled to become a value that is commensurate with its pump discharge pressure and the control pressure Ps.

Here it can be noted and should be understood that the rate of displacement of the servo piston 13 will be fast if the opening area of the variable restriction 26 is large and will be slow if it is small. Since also the opening area of the variable restriction 26 is varied according to the position of the servo piston 13 as shown in FIG. 3, the rate of displacement of the servo piston 13 (i.e., the change rate of the capacity of the hydraulic motor 5) will assume a change as shown by the curve b in FIG. 4. For instance, the said opening area will be greater if the servo piston 13 is located at a position that is closer to the maximum capacity position (MAX) and will become successively smaller as it is displaced towards the minimum capacity position (MIN). It should be noted at this point that if the opening area of the variable restriction 26 is set to vary as shown by the phantom lines in FIG. 3, the change rate of the capacity will assume changes as shown by the phantom lines in FIG. 4.

Figure 4:
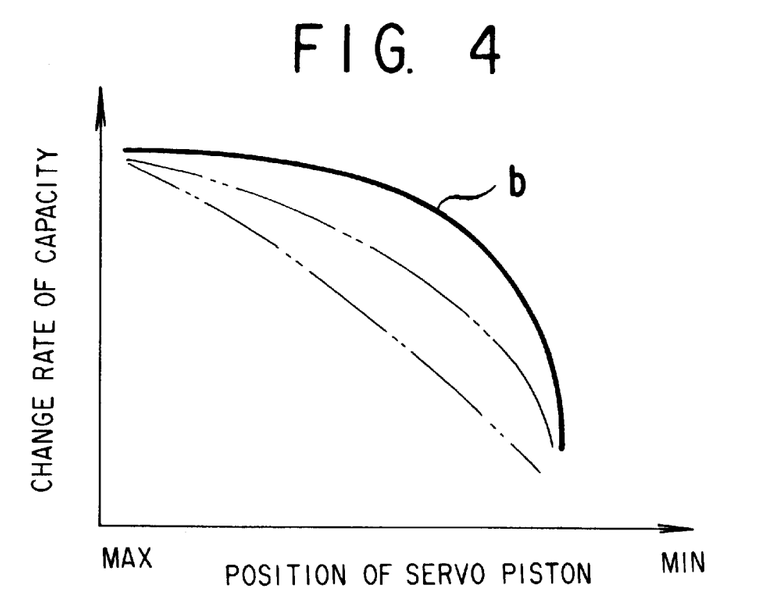
FIG. 4 is a graph that shows a relationship between the position of the servo piston and the change rate of the capacity of the hydraulic motor in the above mentioned first embodiment of the present invention.

It follows, therefore, that if, for instance, the capacity of the hydraulic motor 5 is reduced from its maximum value, it will initially be reduced quickly and will then be reduced more slowly in succession. And, if the capacity of the hydraulic motor 5 is increased from its minimum value, it will initially be increased slowly and will then be increased more quickly in succession.

As will be apparent in the foregoing description, the displacement meter 28, the variable restriction 26 and the controller 27 are here employed to constitute an operation rate of control means for the above mentioned capacity control section.

An explanation will next be given with respect to an operation of the apparatus as a whole that embodies the principles of the present invention.

If the motor vehicle is traveling at a given speed, the rotation speed of the engine 1 will be high, the control pressure Ps will be elevated and the pump discharge pressure of the hydraulic pump 2 will be low. Then, the servo piston 13 will assume a position at which the capacity is a value intermediate between its maximum and minimum vales, thus causing the hydraulic motor 5 to be of a capacity that is intermediate between the maximum and minimum values.

If the engine operating member 9 is manipulated to increase (accelerate) the rotation speed of the engine 1 in this state, the control pressure Ps will be elevated and the servo piston 13 will be displaced in the direction in which the capacity is reduced as described above. Then, since the capacity of the hydraulic motor 5 becomes lower than the intermediate value, the hydraulic motor 5 will be accelerated, thereby permitting the motor vehicle to be accelerated.

Then, the hydraulic motor 5 will have a change rate of its capacity that is lower, and will have the capacity that is slowly reduced. Hence, there will result a smaller change of speed of the motor vehicle that represents its acceleration characteristic while it is traveling.

Also it can be seen that when the motor vehicle is being started from a stop (e.g., while the engine 1 is idling) by manipulating the engine operating member 9 to increase the rotation speed of the engine 1, the capacity of the hydraulic motor 5 will be quickly reduced.

More specifically, when the vehicle is at a stop at which under the control pressure Ps that is then low, the servo valve 20 assumes the drain position B, and the servo piston 13 will then be at its maximum capacity position. If the control pressure Ps is thereafter elevated due to an increase in the rotation speed of the engine 1, the servo piston 13 will be displaced in the direction in which the capacity is reduced. While it is displaced from its maximum capacity position towards its intermediate capacity position, the servo piston 13 will be quickly moved as shown in FIG. 4. This will cause the capacity of the hydraulic motor 5 to be quickly reduced and hence the change of speed or the acceleration of the vehicle to be increased.

As set forth in the foregoing discussion, it can be seen and should be understood that the change of speed or the acceleration of the vehicle will be smaller when it is being accelerated during its travel, and will be greater when it is being started, thus providing therefor an acceleration characteristic and performance which should be fully satisfactory.

It also can be seen and should be understood that, as described earlier, if the engine operating member 9 is manipulated, from the state in which the vehicle is traveling at a given speed, so as to reduce or decelerate the rotation speed of the engine 1, the control pressure Ps will be lowered. Then, since the servo piston 13 is displaced in the direction in which the capacity is increased as mentioned earlier to increase the capacity of the hydraulic motor 5 and in turn to reduce its rotation speed, the vehicle will be decelerated. And, when the vehicle is decelerated to a certain degree, it can then be braked by manipulating the brake operating member 11 to render the brake 8 operative.

Then, it can be seen and should be understood that the change rate of the capacity will initially be slow and will thereafter be accelerated in succession. Thus, the resultant change rate or deceleration of the vehicle will be slower in its initial period and will be quicker in its final period. Hence, a deceleration characteristic and performance for the motor vehicle can be obtained which is, here again, fully satisfactory.

An explanation will next be given with respect to an apparatus that represents a second embodiment of the present invention.

Figure 5:
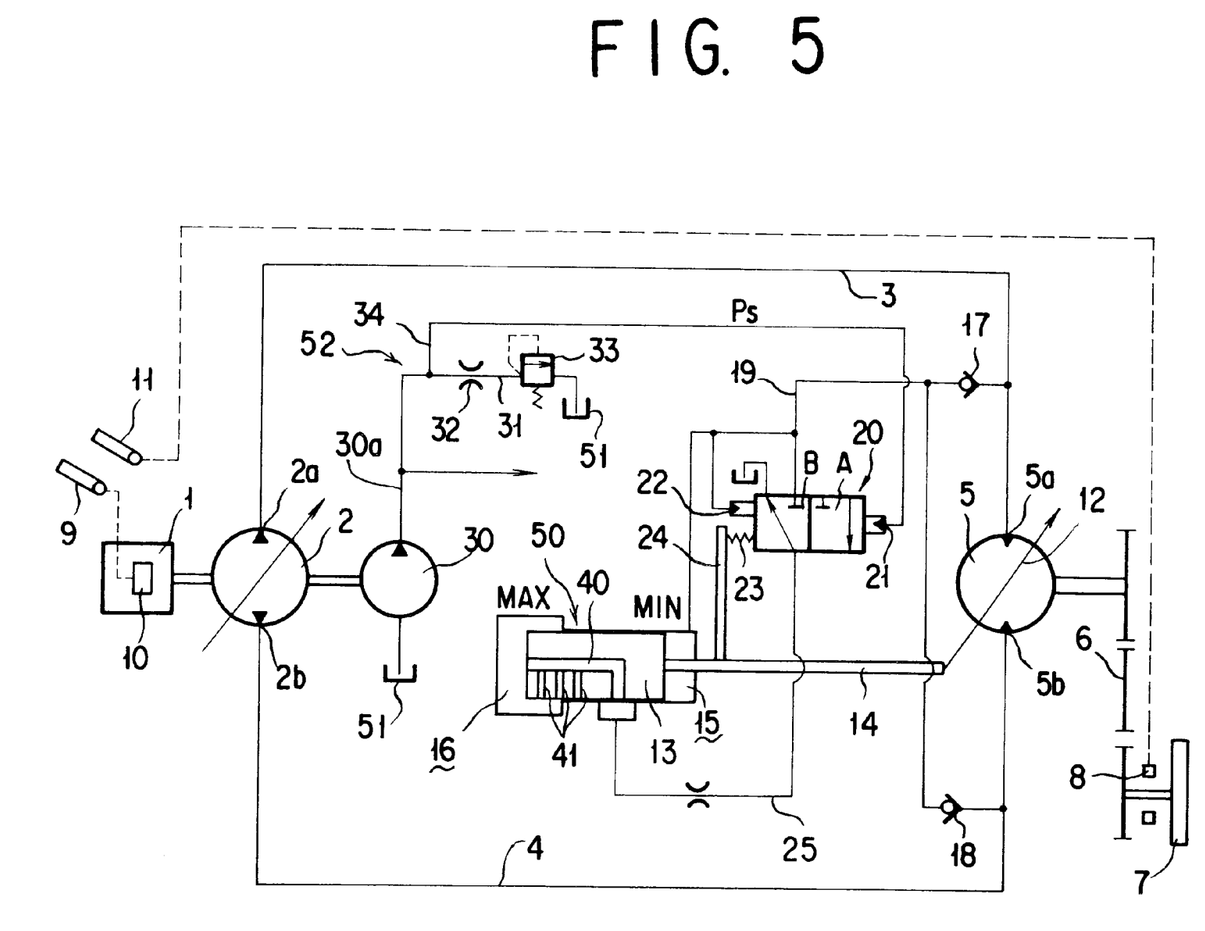
FIG. 5 is a hydraulic circuit diagram that shows a second embodiment with respect to a hydraulic motor capacity control apparatus for a hydraulically driven motor vehicle, according to the present invention.

The apparatus in this embodiment, as shown in FIG. 5, is formed in the servo piston 13 with a main fluid passage 40 that is provided to communicate the circuit 25 and the second pressure receiving chamber 16 with the servo piston 13. In addition, the servo piston 13 is formed therein with a plurality of radially extending and parallel auxiliary fluid passages 41 which are spaced apart in the direction of its displacement to communicate the main fluid passage 40 with the outer peripheral surface of the servo piston 13. And, it can be seen and should be understood that they are so configured that when the servo piston 13 is placed at its minimum capacity position (MIN), the circuit 25 and the second pressure receiving chamber 16 may communicate with each other only via the main fluid passage 40; as the servo piston 13 is displaced towards its maximum capacity position (MAX), the number of the auxiliary fluid passages 41 that communicate with the second pressure receiving chamber 16 may be increased; and when it reaches the maximum capacity position (MAX), the second pressure receiving chamber 16 and the circuit 25 may be rendered to communicate via both the main passage 40 and the whole auxiliary fluid passages 41.

Figure 6:
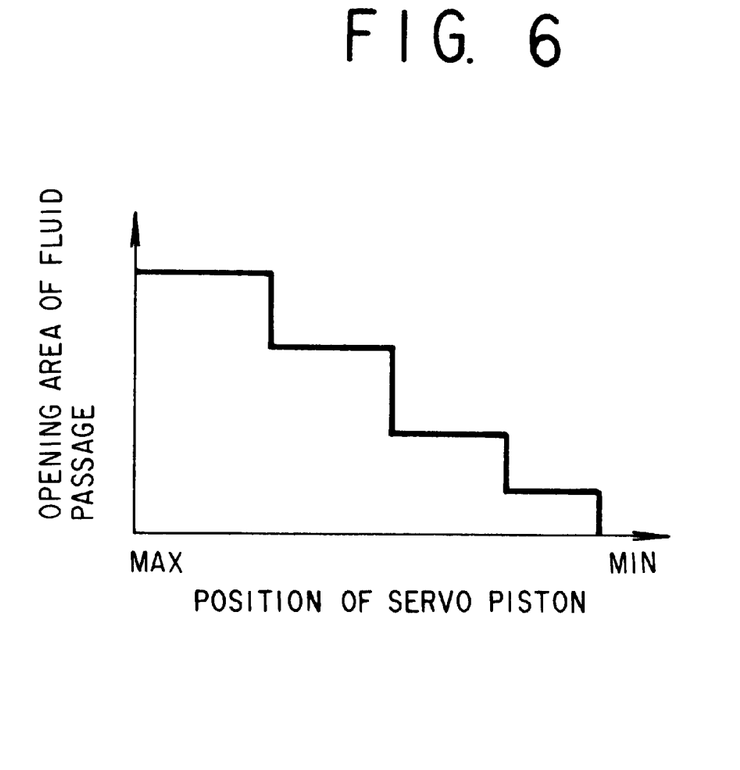
FIG. 6 is a graph that shows a relationship between the position of a servo piston and the opening area of a fluid passage in the above mentioned second embodiment of the present invention.
Figure 7:
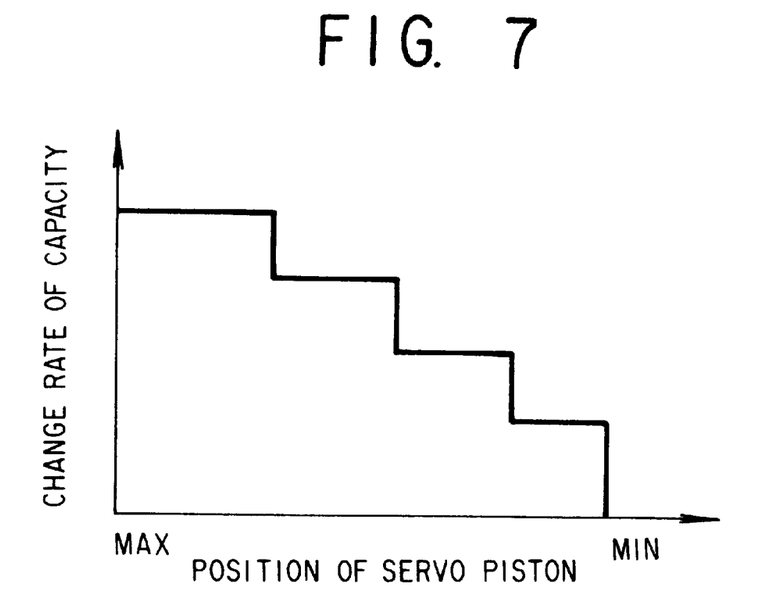
FIG. 7 is a graph that shows a relationship between the position of the servo piston and the change rate of the capacity of the hydraulic motor in the above mentioned second embodiment of the present invention.

If the main fluid passage 40 and the auxiliary fluid passages 41 are so configured, it can be seen and should be understood that the area of the opening which communicates the fluid passage 25 and the second pressure receiving chamber 16 with each other (i.e., the area of the opening towards the second pressure receiving chamber 16) will, as shown by the graph in FIG. 6, be successively reduced stepwise as the servo piston 13 is displaced from its maximum capacity position (MAX) towards its minimum capacity position (MIN). As a consequence, the change rate of the capacity of the hydraulic motor 5, as shown by the graph in FIG. 7, will be the quickest when the servo piston 13 is placed at the maximum capacity position (MAX), will be stepwise slower successively as it is displaced towards the minimum capacity position (MIN) and will be the slowest when it is placed at the minimum capacity position (MIN).

Accordingly, it can be noted that an acceleration characteristic and a deceleration characteristic which are excellent will, here again, be obtained as in the first embodiment described earlier.

In this manner, it will be seen and should be understood that the main fluid passage 40 and the plurality of auxiliary fluid passages 41 which are described above are provided to together constitute an operation rate control means for the capacity control section mentioned earlier.

As set forth in the foregoing description, it will now be appreciated in conclusion that according to the present invention, the capacity of a hydraulic motor 5 will be smaller when the rotation speed of an engine 1 is increased and will be greater when it is reduced; and a servo piston 13 will be quickly displaced while it is between its maximum capacity position and its intermediate capacity position to increase the change rate of the capacity of the hydraulic motor 5 and will be slowly displaced while it is between the intermediate capacity position and its minimum capacity position to decrease the change rate of the capacity of the hydraulic motor 5. It follows, therefore, that the capacity of the hydraulic motor 5 will be slowly decreased when the motor vehicle 7 is being accelerated while it is traveling, will be quickly decreased when the vehicle 7 is being started from a stop, will be slowly increased in an initial period of its deceleration and will be quickly increased in a final period of the vehicle's deceleration.

Accordingly, it can be appreciated that the change rate of the speed or acceleration of the vehicle will be smaller while it is traveling and will be greater as it is being started; and the change rate of the speed or deceleration of the vehicle will be smaller in an initial period of its deceleration and will be greater in a final period of its deceleration. Therefore, it can be appreciated that a fully satisfactory acceleration and deceleration characteristic as a whole for a hydraulically driven motor vehicle is obtained in accordance with the present invention.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. An apparatus for controlling the capacity of a hydraulic motor in a hydraulically driven motor vehicle, comprising:

a hydraulic pump adapted to be driven by an engine having a variable rotation speed;

the hydraulic motor of a variable capacity type adapted to be rotated by a discharge pressure fluid from said hydraulic motor for driving a traveling body that constitute the motor vehicle allowed to travel;

a capacity control section for reducing the capacity of said hydraulic motor when the rotation speed of said engine is increased and for increasing said capacity when said rotation speed is reduced, said capacity control section having a variable operation rate and being operable at a variety of positions among a maximum capacity position, an intermediate capacity position and a minimum capacity position; and an operation rate control means for accelerating the operation rate of said capacity control section when it is operating at a position between said maximum capacity position and said intermediate capacity position and for decelerating the operation rate of said capacity control section when it is operating at a position between said intermediate capacity position and said minimum capacity position.

2. An apparatus for controlling the capacity of a hydraulic motor in a hydraulically driven motor vehicle, comprising:

a hydraulic pump adapted to be driven by an engine having a variable rotation speed;

the hydraulic motor of a variable capacity type adapted to be rotated by a discharge pressure fluid from said hydraulic motor for driving a traveling body that constitutes the motor vehicle allowed to travel;

a capacity control section for reducing the capacity of said hydraulic motor when the rotation speed of said engine is increased and for increasing said capacity when said rotation speed is reduced, said capacity control section having a variable operation rate and being operable at a variety of positions among a maximum capacity position, an intermediate capacity position and a minimum capacity position; and an operation rate control means for accelerating said operation rate of said capacity control section when it is operating at a position between said maximum capacity position and said intermediate capacity position and for decelerating said operation rate when said capacity control section is operating at a position between said intermediate capacity position and said minimum capacity position, characterized in that said capacity control section includes:

a servo cylinder assembly provided with a servo piston coupled to a capacity control member in said hydraulic pump and having a spring coupled thereto, a first pressure receiving chamber having a small pressure receiving area and a second pressure receiving chamber having a large pressure receiving area, which chambers are defined at both sides of said servo piston, respectively, said first pressure receiving chamber being adapted to have a pump discharge pressure from said hydraulic pump applied thereto so that said servo piston may be displaced with a pressure fluid in said first pressure receiving chamber in a direction in which the capacity is increased, and may be displaced with a pressure fluid in said second pressure receiving chamber in a direction in which the capacity is reduced; and a servo valve adapted to be switched into one of a supply position and a drain position thereof, said supply position being switched into for supplying the pump discharge pressure fluid from said hydraulic pump into said second pressure chamber if a control pressure corresponding to a rotation speed of said engine is more than a sum of the pump discharge pressure of said hydraulic pump and a mounting load of said spring, said drain position being switched into for draining a pressure fluid from said second pressure receiving chamber if said control pressure is less than the sum of said pump discharge pressure and said mounting load, said servo valve being also adapted to increase the mounting load of said spring when it is at said supply position and to reduce the mounting load of said spacing when it is at said drain position, whereby the mounting load of said spring is increased when said servo piston is displaced in the direction in which the capacity is reduced, and the mounting load of said spring is reduced when said servo piston is displaced in the direction in which the capacity is increased.

3. An apparatus for controlling the capacity of a hydraulic motor in a hydraulically driven motor vehicle, as set forth in claim 2, characterized in that said operation rate control means includes:

a variable restriction means having a variable area of opening disposed in a circuit for interconnecting said second pressure receiving chamber and said servo valve;

a position detector means for detecting a position taken by said servo piston to provide an output signal; and a controller means responsive to said output signal for increasing the variable opening area of said restriction means when said output signal indicates that the position of said servo piston detected by said position detector means lies between said maximum capacity position and for reducing the variable opening area of said restriction means when said output signal indicates that the position of said servo piston detected by said position detector means lies between said intermediate capacity position and said minimum capacity position.

4. An apparatus for controlling the capacity of a hydraulic motor in a hydraulically driven motor vehicle, as set forth in claim 2, characterized in that said operation rate control means includes a fluid passage formed in said servo piston for communicating said second pressure receiving chamber and said servo valve with each other, said fluid passage having a variable opening area adapted to be increased when the position of said servo piston lies between said maximum capacity position and said intermediate capacity position and adapted to be reduced when the position of said servo piston lies between said intermediate capacity position and said minimum capacity position.

5. An apparatus for controlling the capacity of a hydraulic motor in a hydraulically driven motor vehicle, comprising:

a hydraulic pump adapted to be driven by an engine having a variable rotation speed;

the hydraulic motor of a variable capacity type adapted to be rotated by a discharge pressure fluid from said hydraulic motor for driving a traveling body that constitutes the motor vehicle allowed to travel;

a capacity control section for reducing the capacity of said hydraulic motor when the rotation speed of said engine is increased and for increasing said capacity when said rotation speed is reduced, said capacity control section having a variable operation rate and being operable at a variety of positions among a maximum capacity position, an intermediate capacity position and a minimum capacity position; and an operation rate control means for accelerating said operation rate of said capacity control section when it is operating at a position between said maximum capacity position and said intermediate capacity position and for decelerating said operation rate when said capacity control section is operating at a position between said intermediate capacity position and said minimum capacity position;

wherein said operation rate control means comprises a variable restriction means.

\* \* \* \* \*